Oct. 16, 1928.  1,687,886
R. PHILIPP
APPARATUS FOR THE UTILIZATION AND TREATMENT OF
DIFFICULTLY MANAGEABLE WASTE MATERIAL
Filed Sept. 5, 1924   4 Sheets-Sheet 1
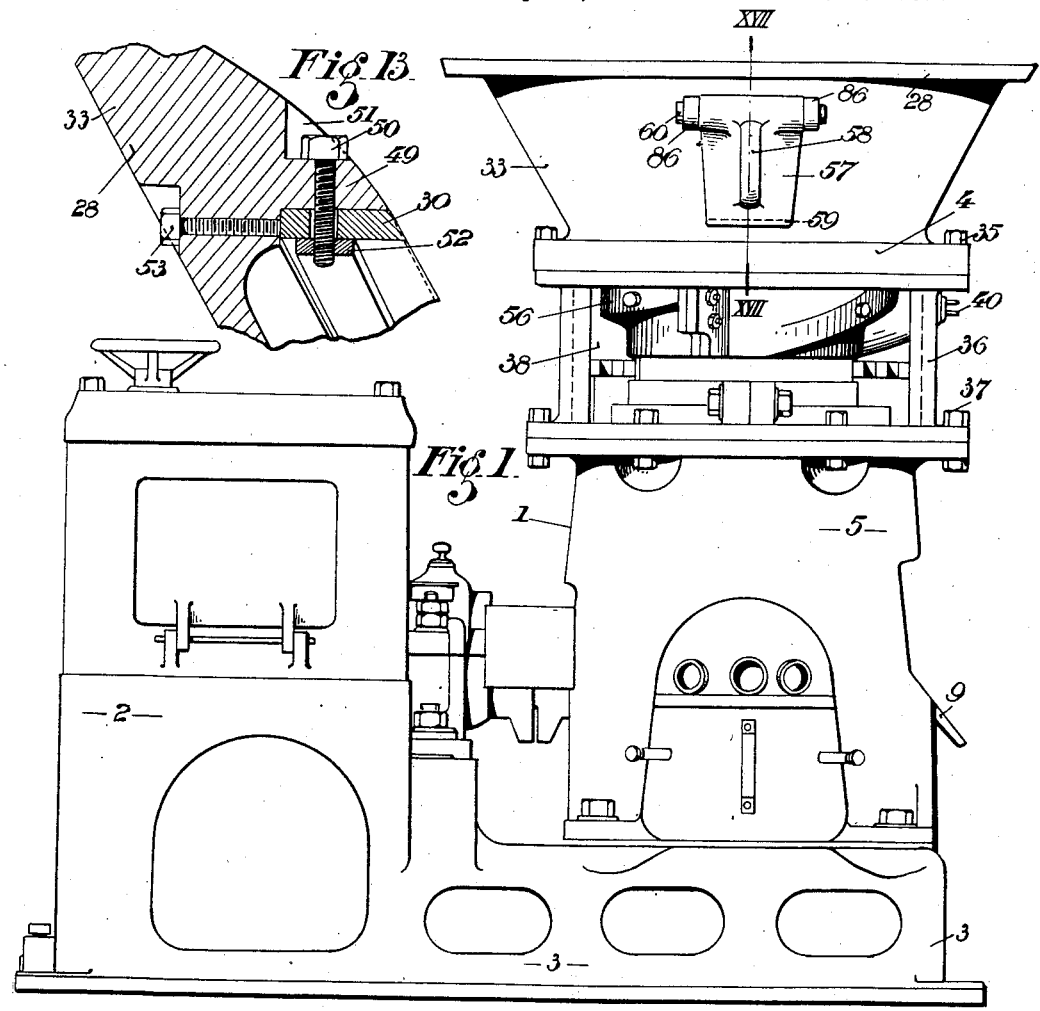
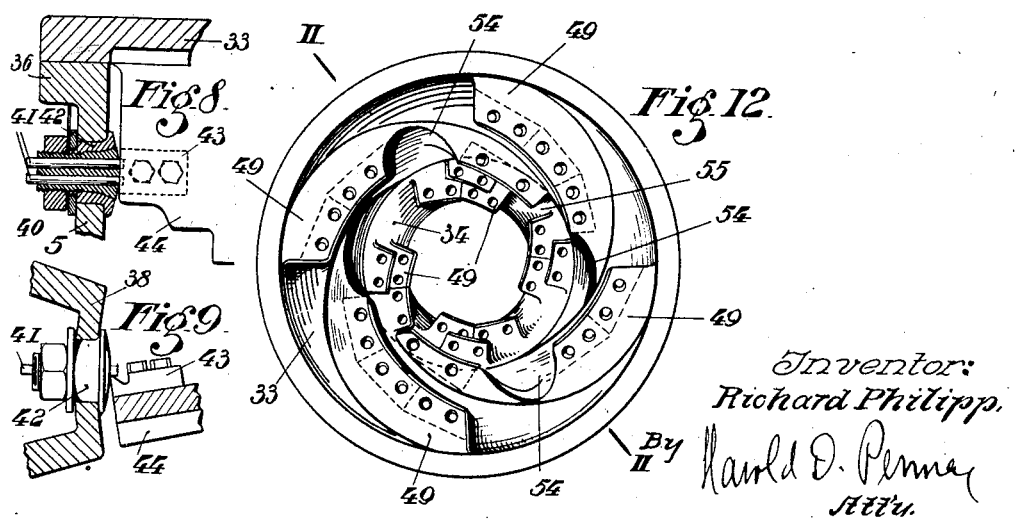
Inventor:
Richard Philipp,
By Harold D. Penney
Att'y.

Oct. 16, 1928. 1,687,886
R. PHILIPP
APPARATUS FOR THE UTILIZATION AND TREATMENT OF
DIFFICULTLY MANAGEABLE WASTE MATERIAL
Filed Sept. 5, 1924  4 Sheets-Sheet 2
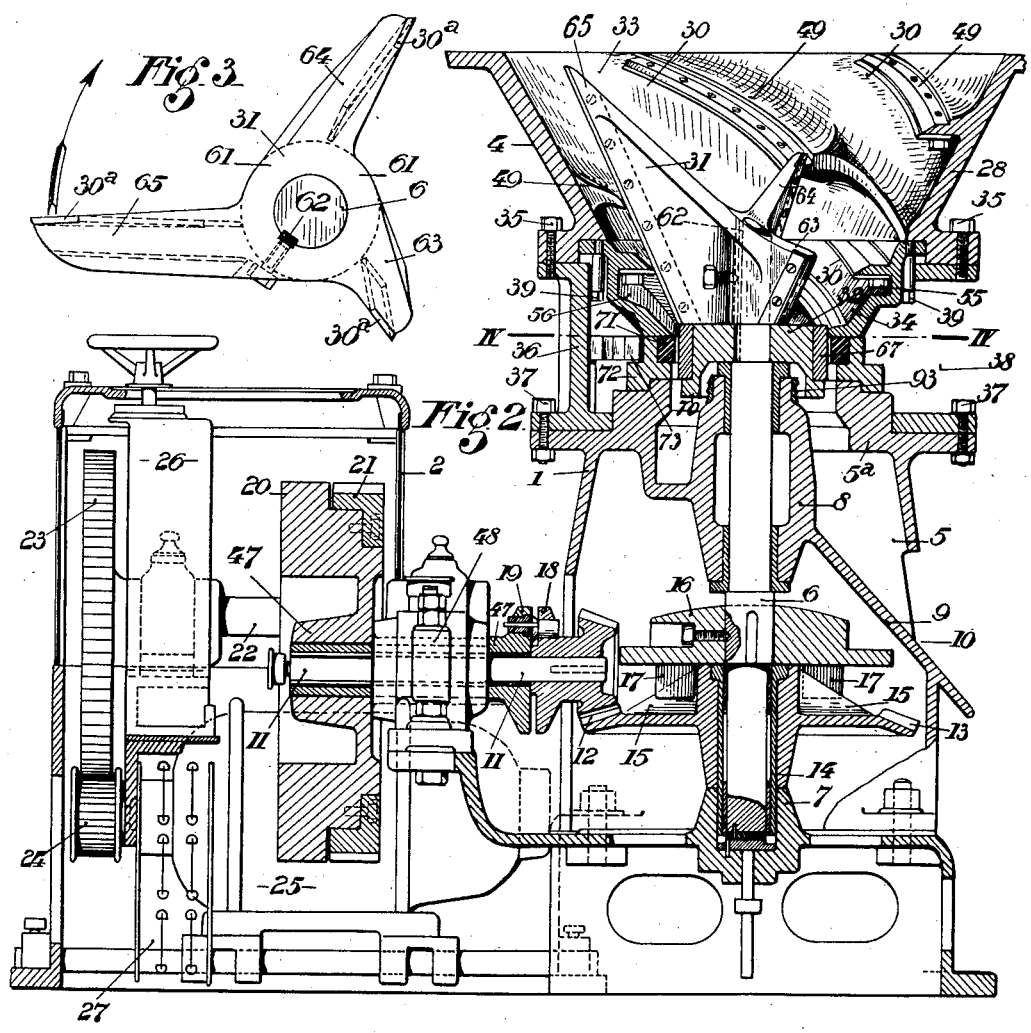
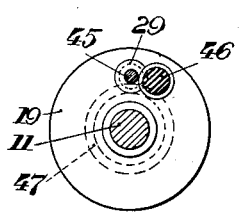
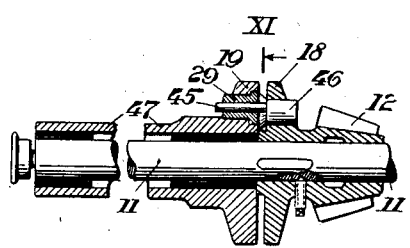
Inventor:
Richard Philipp,
By his Atty. Harold D. Penney

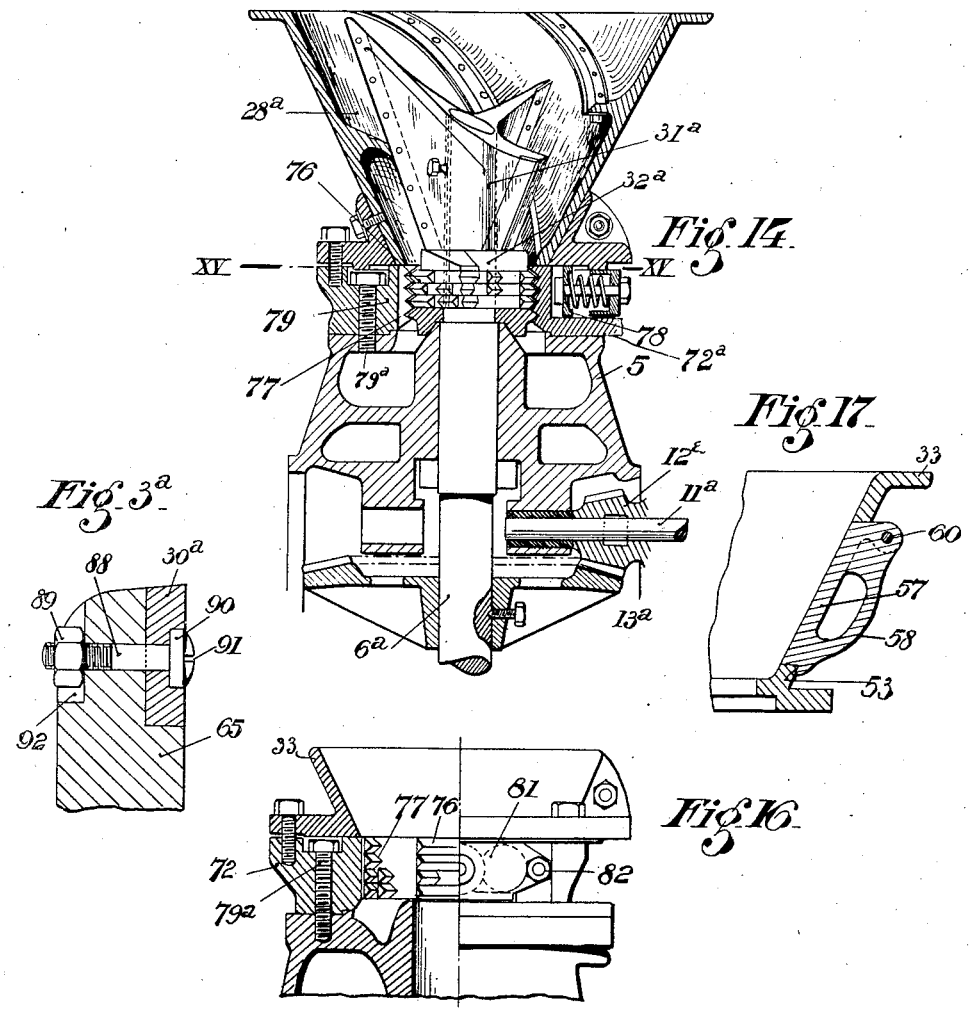

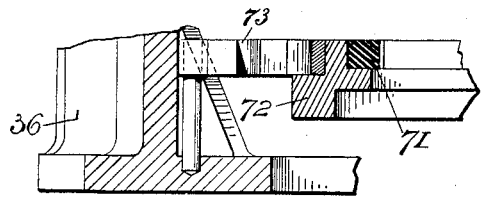
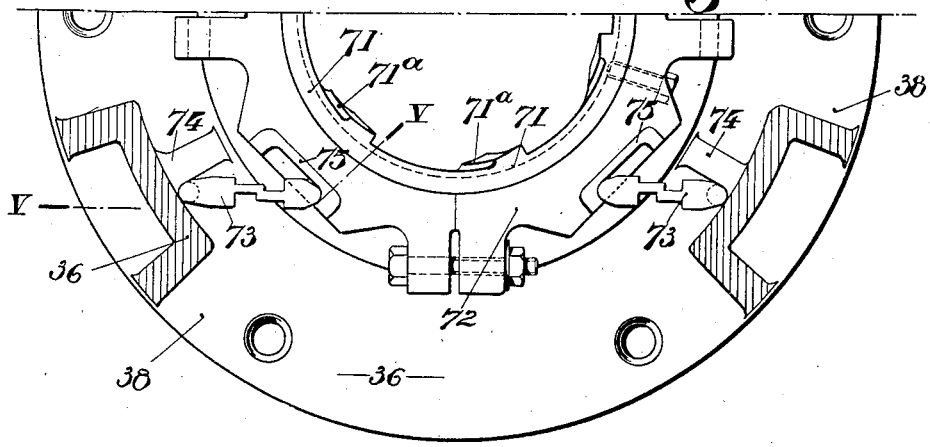
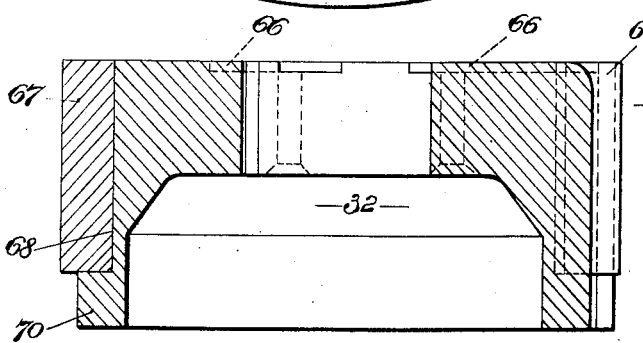
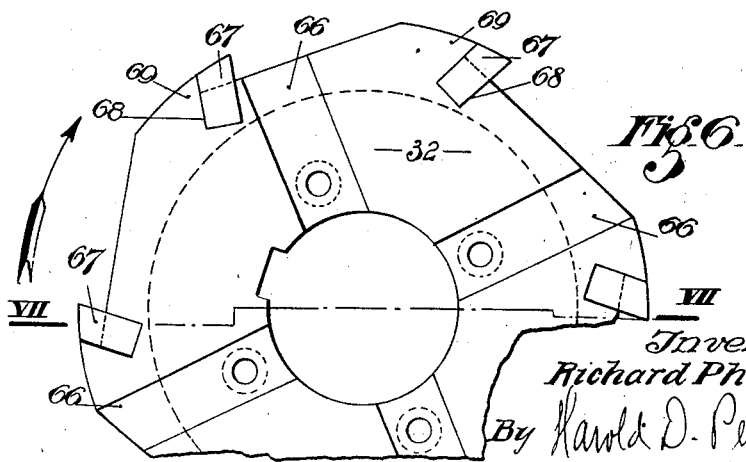

Patented Oct. 16, 1928.

1,687,886

UNITED STATES PATENT OFFICE.

RICHARD PHILIPP, OF EISENACH, GERMANY, ASSIGNOR TO THE FIRM MAGNET-WERK G. M. B. H. EISENACH SPEZIALFABRIK FÜR ELEKTROMAGNET-APPARATE, OF EISENACH, SAXE-WEIMAR, GERMANY.

APPARATUS FOR THE UTILIZATION AND TREATMENT OF DIFFICULTLY-MANAGEABLE WASTE MATERIAL.

Application filed September 5, 1924, Serial No. 736,089, and in Germany February 12, 1924.

My invention relates to a method and means for increasing the value and for the utilization and treatment of difficultly manageable waste material and it particularly refers to bulky waste of metal, wood and the like and it intends to provide means of reducing such material to a substantially uniformly mixed and comminuted marketable mass of high grade easily transportable scrap, and among other uses and applications the invention may be particularly applied to the treatment of tin cans, sheet metal containers and the like, provided with enamel or with some other coating, and to the treatment of other metal parts and articles, and it also refers to apparatus or machines for the execution of such methods.

My invention has for one of its chief objects the utilization and increase of value of the large amount of rejected, worn-out or otherwise unfit enameled sheet metal articles, such as pails, pots, kitchen utensils and the like which constitute a large portion of the waste material deposited upon the garbage heaps of large cities. The invention intends to directly reduce these and similar articles to a kind of granular or small-pieced scrap which has been cleaned from the coating, and is therefore in direct condition to go to the smelter. The method according to this invention may, however, be likewise employed for the treatment of tin cans or sheet metal preserve boxes with paper labels or the like pasted onto them, and which by the treatment according to this invention are likewise freed from these kinds of coating, yielding a comparatively pure and therefore more easily marketable scrap which is in condition for direct treatment in the smelting works.

It is another object of my invention to combine the removal of the coatings from the metal parts under treatment with the simultaneous comminution of the latter, so as to make it possible to convert the waste material under treatment in a continuous process into the finished subdivided scrap of comparatively small volume of its own, and ready for the subsequent metallurgical treatment, and without the necessity of submitting the waste material to any kind of preliminary treatment or to any assorting or similar process.

It is another object of my invention to provide an apparatus by means of which waste metal, particularly turnings and similar material difficultly to be manipulated may be comminuted in a particularly efficient manner, to form a comparatively finely granular material adapted to be shoveled and to be run into containers and occupying but little volume.

In view of these and other objects and advantages which will more clearly appear from the following specification the invention substantially resides in the fact that the articles to be treated are submitted to comminution by machinery combined with a considerable degree of deformation, and without previous assorting or disassembling. The comminution is preferably effected by means of a device in which a plurality of rotating knives or cutting units cooperate with a plurality of stationary counter-knives or abutments, and in such a manner that the material under treatment is bent, compressed, pushed and rammed, fractured, split, torn, scraped and cut up by the inter-engaging comminuting members, in which operation in the case of the treatment of enamel-coated articles the enamel coating is for the most part detached and splinters off by itself from the metal articles, before the cutting operation of the comminuting means is substantially started.

The invention further resides in the provision of mechanically operated subdividing means whereby the working up of enamel coated metal articles may be carried out in a particularly convenient and advantageous manner, but which, furthermore, admits of the comminution of other kinds of metal and other waste, and particularly of bulky and difficultly manipulated turnings, so as to convert them in an efficient manner into heaps of masses readily adapted for shoveling and for being run into hoppers or containers. In its essential features the novel comminuting and disintegrating means according to this invention comprises a system of rotating knives or cutting units adapted for cooperation with relatively stationary counter knives, abutments or the like, operating substantially in the manner above referred to.

The invention will be more fully described with reference to the accompanying drawings, showing by way of exemplification two kinds of embodiment of the principles of this invention, without however restricting the invention to such particular modes of embodiment shown by way of illustration merely.

In the drawings, Figure 1 shows a form of apparatus of the kind referred to in side view.

Figure 2 shows the comminuting apparatus in vertical sectional view through the axis with some parts of the casing in elevation, the section through the funnel of the disintegrating apparatus being on the line II—II of Figure 12.

In Figure 3 a knife-head or cutting unit is shown in elevation, and on a somewhat enlarged scale.

Figure 3ª is a cross section through one of the arms of the knife-head, showing the manner of mounting the knives.

Figure 4 is a horizontal section on the line IV—IV of Figure 2.

Figure 5 is a fragmentary vertical section on the line V—V of Figure 4.

Figures 6 and 7 illustrate on a more enlarged scale the knife-head operating in the lower portion of the hopper in plan view and respectively in sectional view on the line VII—VII of Figure 6.

Figure 8 is a vertical section of a detail of the apparatus.

Figure 9 shows said detail in horizontal section.

Figure 10 illustrates another detail of the apparatus in sectional view through the shaft coupled with the mechanism for the driving engine or the like of the apparatus.

Figure 11 is a section on the line XI—XI of Figure 10.

Figure 12 is a top plan view of the hopper of the apparatus.

Figure 13 is a vertical section through a portion of the hopper of the apparatus for an illustration of the manner of mounting the abutments or counter-knives on the wall of the hopper.

Figure 14 is a vertical section showing a modified form of construction of the comminuting device.

Figure 15 is an elevation of part of the bottom portion of this form of construction after the removal of the upper portion corresponding to the line XV—XV of Figure 14.

Figure 16 shows this form of construction in its left hand portion as a vertical section at right angle to the section of Figure 14, and in its right hand portion in side view in accordance with the arrow XVI of Figure 15.

Figure 17 illustrates a detail in a partial vertical section through the hopper of the apparatus on the line XVII—XVII of Figure 1.

The form of construction of the apparatus, illustrated in Figures 1 to 13 comprises the disintegrating or comminuting device proper 1 and the driving means 2 both of which are mounted upon a common base 3, as appears particularly from Figures 1 and 2. The disintegrating device as such contains the disintegrating section 4 and the supporting base casing 5 which encloses the driving mechanism and the coupling means for the operating parts of the machine. In the interior of this casing 5 the main shaft 6 of the machine is vertically mounted, preferably by means of a foot step bearing 7 arranged in the base 3 and by a collar bearing 8 in the upper portion of the supporting base. The body of the collar bearing 8 is preferably cast in one piece with an inclined wall 9 which passes through the base to the outside. This inclined wall serves also as a delivery chute for the comminuted material treated, and for this purpose it is outwardly extended through an opening 10 of the base. The upper portion of the body of the bearing 8 is surrounded by a steel ring 93 which is mounted, while hot, or jumped upon the bearing 8, so that it encompasses the end of the bearing body 8 under great tension. By this means bursting of the bearing body 8 is prevented. This shrinked crimping ring 93 which is provided with outer grooves or incisions affords a protection of the bearing against the entrance of dirt and foreign bodies, such as for instance small pieces of chips or scale which would cause excessive heating and rapid wearing of the journal bearing. The grooves provided in the ring 93 by turning or otherwise and the walls of which are in part obliquely extended downwards become gradually filled with grease from the bearing which forms a thick paste with the dust and the like and constitutes a thoroughly tight packing for the bearing proper. The grooves may also be filled with leather or with packing cord. During the up- and downward movements of the knife head 32 to be described hereinafter the grooves of the ring 93 or the material inserted therein scrape off and remove the dirt deposited in the cavity of the knife head.

The shaft 6 is actuated by a horizontal shaft 11, and by means of the train of bevel gears 12, 13 of which the smaller gear wheel 12 is keyed to the shaft 11, while the larger bevel wheel 13 is loosely and rotatably mounted upon the lower portion of the main shaft 6. With this end in view a sleeve or bush 14 is mounted between the bevel wheel 13 and corresponding part of the shaft. The operation of the shaft 6 by the bevel wheel 13 is effected with the aid of a clutch coupling which comprises on the one hand two ribs 15 on the top of the gear wheel 13, and on the other hand, a clutch piece 16 rigidly keyed to the shaft 6, and adapted to become engaged by means of two downwardly directed projections 17 with the ribs 15. The clutch piece 16 is of very strong rugged construction, so as to be adapted to act as a load for the shaft 6. By means of this weight the shaft 6 which may have an inch or more vertical play may be downwardly depressed.

The smaller gear wheel 12 (Figure 10) is made integral with the part 18 of a clutch coupling 18, 19, the part 18 being keyed to the shaft 11 upon which the other coupling member 19 is loosely mounted. The part 19 forms the end of a sleeve 47 rotatably mounted in the bearing 48 (Figure 2) of the casing 2 and on the other end of which a fly wheel 20 is mounted provided with a rack 21. This circular rack 21 meshes with a gear wheel on the shaft 22, and not shown in the drawing. The shaft 22 is journaled in the casing 2, and on its side opposite the gear wheel last mentioned said shaft 22 carries a large gear wheel 23 in mesh with a small gear wheel 24. This latter wheel 24 is mounted on the shaft of an electric motor engine 25 disposed in the bottom part of the casing 2, and furnishing the driving power for the comminuting device. The motor engine is provided in the usual manner with a controller 26 for starting purposes and for the interruption and the reversal of the rotary movement. The corresponding electric resistance is indicated at 27.

The comminuting and disintegrating means proper comprise essentially the hopper 28 with the relatively stationary knives or abutments 30 provided on the interior walls thereof, and the two knife heads 31 and 32 mounted upon the upper end of the shaft 6 which projects from below into the hopper 28. This hopper or funnel consists of two sections, the upper funnel portion 33 and the lower funnel section 34 of which the upper funnel portion 33 is rigidly connected by means of screws 35 to a supporting carrier or cage 36 which is rigidly mounted by screws 37 on the base 5. The cage or support 36 is provided with lateral openings 38 (Figures 2 and 4), so as to afford convenient access to the lower portion 34 of the hopper which projects from above into said supporting carrier, and to the members connected to the bottom of the portion 34. This part 34 is, moreover, not rigidly connected to the upper hopper portion 33, nor to the base 5 of the casing; it is merely frictionally connected to these parts, the connection with the base 5 being effected by means of an annular body or an intermediate piece 72. The friction on the upper portion 33 of the hopper may be regulated within certain limits by means of the screw bolts 39 which are passed through threaded holes of an upper flange of the lower funnel section 34, and the upper ends of which bear against an inwardly projecting rim of the upper funnel section 33. By turning the screws 39 more or less the frictional engagement between the lower funnel section 34 and the parts bearing against the upper and lower portions thereof may be increased or diminished. Of such screws 39 eight have been provided correspondingly distributed upon the periphery. By means of the loose arrangement of the lower funnel portion 34 the effect is produced that, in case massive and solid pieces are contained in the material to be treated by the apparatus, the operating members of the apparatus are protected against being excessively strained or broken. Such pieces of material which are not directly comminuted by the apparatus, are usually left sticking in the lower portion of the hopper. Now, if provision is made for this part to be rotatably shifted by excessive straining in consequence of its frictional engagement with the adjoining portions of the apparatus, injuring or breaking of the portions of apparatus acted upon will in most cases be entirely obviated.

In order to prevent that the lower hopper portion is already shifted by less forcible strains, an additional safety means is provided which is indicated as a whole at 40 in the drawing (Figures 1, 8 and 9). This safety member comprises two studs or bolts 41 which, by means of a screw threaded sleeve 42 are inserted in the wall of the supporting carrier 36. With these studs 41 a steel member 43 is adapted to become engaged which is screw threadedly secured to a rib portion 44 outwardly projecting from the lower funnel portion 34. The outer end of the steel member 43 is blade shaped, so that upon excessive strain on the lower funnel portion 34 the pins 41 may be clearly sheared or cut off. By this means the lower funnel portion 34 becomes detached so that it may be carried along by the knife head 31 and by the medium of the foreign body which has caused the disturbance, the said portion 34 being only somewhat brakingly retarded by the frictional engagement with the adjoining portions of the apparatus.

An additional safety means against the occurrence of breakage is combined with the coupling means 18, 19 above described (compare Figures 10 and 11). In the coupling section 19 a similar shearing stud 45 is inserted by the medium of a collar 29, the said stud 45 being in engagement with a steel member 46 inserted in the coupling member 18 and provided with a cutting blade. In case a particularly rugged or excessively strong foreign body happens to exist in the comminuting apparatus or in case any other disturbance should occur which is apt to arrest the driving means or said comminuting means the stud 45 will be cut off by the blade of the steel member 46, unless the lower funnel portion 34 will yield in the manner above described, or unless the disturbance may be remedied in some other manner, so that the driving engine 25 is protected against excessive jars and blows. The pins or studs 41, 46 are preferably made from a special high grade steel which cannot readily be replaced by studs of still more resistible material on the part of the operators, which would seriously interfere with the protecting action.

A further means of safety protection for the motor engine is presented by the arrangement of the fly-wheel 20 the momentum of which must first be consumed by the particular excessive strain, before the latter can affect the motor. Besides, the fuses of the current conductors afford an additional means of protection for the motor engine.

In the form of construction shown by way of exemplification the hopper 28 which is formed of the two sections 33 and 34 presents the shape of an inverted truncated cone. It may, however, also assume the shape of a polyangular truncated pyramid. The upper section 33 contains four series of counter-knives or abutments, slantingly arranged on the inner wall of the hopper. Each of the four series of abutments starts from the upper edge of the hopper. The knives are secured to projections 49 spacedly arranged along substantially helical lines on the wall of the hopper. The manner of fastening is more particularly illustrated in Figure 13 of the drawing. As appears from this figure, the knives 30 are caused to bear against the undersides of the ribs 49. They are retained by screw bolts 50 the heads of which are housed in corresponding recesses 51 of the ribs 49, while the lower ends of the screws 50 are engaged by bars 52 bearing against the bottom sides of the knives 30. By means of set screws 53 accessible from the outside of the hopper the inner ends of which are bearing against the outer edges of the knives 30, these knives may be inwardly adjusted. The upper sides of the ribs 49 are inclined and as smooth as possible, so that the material thrown into the hopper may not be retained or prevented from descending. For this purpose the heads of the bolts 50 are countersunk in the ribs 49. In order to provide room for the fastening bolts 50 and the retaining bars 52 special pocket-like sockets 56 are provided below some of the ribs 49, as shown in Figure 2 in the corresponding portion of the wall of the hopper. It also appears from Figure 2 that the fastening of the knives 30 may also be effected by means of head screws inserted from below into the ribs 49 and passing through the knives 30, the heads of said screws being housed in the socket portions 56.

The bottom sides of the ribs 49 in contradistinction to their upper sides are sharply projecting towards the inside of the funnel from the walls thereof, thereby producing very powerful abutments. These ribs or abutments 49, however, as appears particularly from Figure 12 of the drawing, do not constitute continuous helical lines in view of their being interrupted by recesses 54 adapted to permit the direct passing of the material under treatment from one of the helical lines formed by the knives 30 to the system of knives 30 next below the same. With the same end in view, the series of knives of the lower section 34 of the funnel which are likewise helically arranged, do not constitute the direct continuation of the groups of knives of the upper section 33 of the hopper, but gaps 55 are provided upon the points of transition from one group of knives to the other, through which gaps the material under treatment may pass directly.

It further appears from Figure 12 that each two diametrically opposite ribs 49 are provided with three knives each and combined to form continuous groups, while the two other oppositely opposed ribs 49 present each a group of two knives and an additional knife separated therefrom by the gaps 54. In a similar manner the ribs 49 of the lower hopper section 34 are furnished with groups of two knives and with singly mounted knives. The helical lines formed by the ribs 49 of the lower section of the hopper do not form the direct continuation of the helical lines formed by the ribs 49 of the upper hopper section, but they are preferably breaking lines or laterally shifted relatively thereto, so that the front portions of the relatively lower knives are disposed above the rear portions of the relatively upper knives so as to constitute larger gaps adapted to afford room for the passage of a portion of the articles to be comminuted or disintegrated. In view of the fact that the knife blades are difficultly to be manufactured in an exactly helical form they are preferably made of single smaller pieces which are subsequently aggregated. The several single pieces may in this case consist of flat steel plates which are fastened to the accordingly broken faces of the ribs or abutments 49. The cutting edges proper of the knives may represent parts of ellipses.

In order to arrive at an easy accessibility of the hopper 28 from the outside for the purpose of readily removing foreign bodies, the side wall of the hopper is provided with a closing member or a cover 57 (Figures 1 and 17) and being constituted by a sectional portion of the hopper wall, provided with a handle 58. The lower edge possesses a recess 59, adapted for engagement with the correspondingly sharpened edge of the respective portion of the hopper wall. The locking of the closing member 57 in this position is effected by a bolt 60 detachably inserted in corresponding apertures of the closing member 57 and in two eyes 86 projecting from the hopper wall and bearing against the upper end of the closing member.

The inner edges of the stationary knives 30 of the hopper or funnel 28 are substantially arranged upon the outside of a cone with downwardly directed apex. Upon the same cone surface are arranged the cutting edges of the rotating knives 30ª of the knife head 31. The formation of this knife head or cutting unit is shown more clearly in Figures 2 and 3 of the drawing. The head 31 comprises a hub portion 61 which is rigidly connected to the shaft 6 by means of a wedge or key 62 extending the entire length of the cutting unit. The hub portion 61 forms a common integral piece of casting with the three arms 63, 64 and 65 carrying the knives 30ª. These arms are of different lengths, the arm 65 being the longest. Then follows, seen in the direction of the rotation of the knife head, the arm 64 of medium length and thereupon the shortest arm 63. The knives 30ª do not exactly coincide with the generatrices of the cone surfaces in which they are arranged, but with their lower ends the cutting edges 30ª are situated somewhat back of the cone generatrices passing through their upper ends, and as seen in the direction of rotation of the knife head. In consequence thereof the action of the knives 30ª upon the material under treatment produces a backward-pressure component having the tendency to lift the knife head 31. The action of this component is opposed by the weight of the knife head and of its shaft 6, and before all, by the weight of the particularly heavy coupling member 16 secured to the lower portion of the shaft 6. If in the case of very resisting foreign bodies being introduced into the machine the pressure upon the knife head 31 becomes too large its vertical components will gain the ascendency over the action of the weights mentioned, so that the knife head is automatically raised, and the knives become adapted to yield to the particular foreign bodies. The possibility of raising the knife head, therefore, constitutes an additional safeguard against breakage.

The fastening of the knives 30ª to their respective arms is effected by means of screws. If the screws would be screw-threadedly inserted into the steel casting of the arms of the knife head, they could only be removed therefrom by a drilling operation, after the heads of the screws have been worn out. It is therefore preferable to employ nut screws. The nuts of such screws, however, must be protected, and the heads of the screw bolts must be strong enough to retain the knives. Figure 3ª illustrates the formation and arrangement of the nut screws the shafts of which are indicated at 88. In order to be able to tighten or loosen the nuts 89, the heads 90 of the screws 88 are provided with a slot 91, so that they may be held tight with the screw driver. The nuts are disposed in sockets 92 provided upon the rear side of the knife arms, whereby they are protected. The heads 90 of the screws are countersunk in cylindrical sockets of the knives 30ª.

Below the knife head 31 another knife head 32 is mounted upon the shaft 6 the details of the construction of which are clearly shown in Figures 6 and 7. The connection of the head 32 with the shaft 6 is effected by means of the key or wedge 62 retaining the upper knife head 31, and which is downwardly correspondingly extended. Besides, the movement of the knife head 32 by the shaft 6 is still further insured by the fact that the upper knife head 31 by means of a suitable number of for instance four ridges or wedges projecting from its bottom surface engages with grooves 66 provide upon the top side of the lower knife head 32. This kind of highly resisting connection is necessary, because the lower knife head 32 which is particularly heavily strained would not be sufficiently secured in position by a mere connection by keys or wedges with the comparatively short piece of shafting 6 which it surrounds, particularly in view of the fact that also the hub portion of the head 32 is of rather short length, so as to make the lever arm upon which the reaction pressure of the knife heads is operating, substantially not longer than is absolutely necessary. The lower knife head is constructed similar to the usual cutter heads. The knives 67 of this knife head have their cutting edges arranged on a cylindrical surface. The knives are inserted in grooves 68 which are arranged adjacently to projections 69 which serve as abutments for the knives. The lower part of the knifehead 32 is provided with a projecting rim 70 fitted in bell-like fashion over the upper end of the collar bearing 8 with the crimping ring 93.

The knives 67 of the lower knife head 32 cooperate with a row of knives 71 (Figures 4 and 5) engaging a recessed portion of an annulus 72 which is disposed between the bottom end of the lower hopper section 34 and the upper rim portion 5ª of the base 5 of the casing. The circular row of knives 71 is provided at its inner wall with abutments or counter-knives 71ª the edges of which constitute steep helical lines, so that they form angles with the cutting edges of the rotating knives 67.

The lower hopper or funnel-section 34 does not constitute an integral annular body, but in the construction shown it is composed of four sectors, formed by radially extending separating joints, so that the said member 34 may be taken out through the openings 38 of the cage 36, whenever required, without it being necessary to detach the upper section of the hopper. Also the annulus 72 may be made to consist of four sections in a similar manner.

In order to secure the annulus 72 against rotation, it is provided with two special stays or supporting and stiffening members 73, adapted to bear against the surrounding cage 36. Each of the said bodies 73 abuts with one of its ends against a rib 74 inwardly projecting from the cage 36, while the other end is engaged with a socket or cupped portion 75 provided in the annulus 72. This member or socket 75 is made of hardened steel, in order to protect the annulus 72 itself against injuries from the engagement of the stays 73. These members 73, as appears from Figure 4, have a cranked portion for the purpose of being able to more securely calculate and observe the bending and rupturing strain or resistance to buckling of such bodies 73.

The operation of these parts is as follows. If, for example, by the penetration of foreign bodies between the teeth of the knife head 32 on the one hand and those of the row of knives 71 on the other hand the compressing strain between the parts referred to becomes excessive, either one of the two stays or supporting bodies 73 will be fractured according to the direction of rotation of the knife head 32, by which means the strain is relieved from the machine. The occurring disturbance, and the subsequent relieving of the strain may be watched by the operator manipulating the apparatus by means of an ampere meter which is preferably included in the circuit of the electro-motor operating the apparatus. The same procedure may be employed with regard to those disturbances causing the operation of the safety devices against rupture which have been above described. The operator will then in the first place try whether, upon reversing the motor engine, the machine does not get loose from the foreign body by itself; or he will have to stop the machine, and to ascertain the cause of the disturbance. If it is due to any trouble in the hopper 28, he may overcome the disturbance either from above or by opening the closure 57. If the foreign body which causes the disturbance is contained in the refining or finishing comminution member, formed by the lower knife head 32 and the annular row of knives 71, the operator can expose the particular portion of the apparatus by the taking apart of the annulus 72, and will then be in position to remove the foreign body.

The modified form of apparatus shown in Figures 14, 15 and 16 of the drawing is substantially distinguished from the form of construction hereinbefore described merely by a particular construction of the refining or finishing comminution members. This part of the device as in the construction previously referred to comprises a knife-head 32$^a$ the cutting means of which, however, comprise four groups of substantially wedge-shaped knives 76 annularly disposed one above the other, and distributed over the periphery of the knife head with irregular spaces between each other. The knives 76 which are carried along with the rotating knife head 32$^a$ become engaged with relatively stationary knives 77 which are correspondingly fashioned, and which project inwards from an annulus 72$^a$ surrounding the knife head 32$^a$ in such a manner that the knives 77 are engaged with the interstices between the superposed rows of the knives 76, and inversely. The peripheral distances between the knives of the rotating as well as between those of the relatively stationary groups of knives are so arranged and distributed that between the knives of the two groups gaps are formed in certain stages of the rotation of the knife head 32$^a$ into which the material contained in the lower portion of the hopper 28$^a$, and which has undergone a preliminary comminution by the knife head 31$^a$ within the latter is adapted to become lodged, even if such pieces should be of larger size, so that they are sure to be caught by the knives 76, 77.

The annulus 72$^a$ which, in this modified construction, is integral with the knives 77 is likewise subdivided into four sectors in this construction, which sectors are, however, displaceable in the radial direction. Each of the sectors, as particularly appears from Figure 15, is guided along the inner side surfaces of four projections 79 extending upwards from the casing or base 5 and secured to the base 5 by screws 79$^a$. Each of the sectors 72$^a$ is forced inwards by springs 80 the inner ends of which are bearing upon the sector 72$^a$, and the outer ends of which bear upon the cross head 81 which is secured to the projections 79 by means of screws 82. By means of a bar 83 mounted on the cross head 81, and the head portion 84 of which is adapted to engage a recess 85 of the particular sector of the annulus 72$^a$ the inward movement of the particular sector is limited. The amount of this movement may be adjusted by a screw nut 86 mounted on the bar 83. In the outward direction the sector 72$^a$ is adapted to yield by the compression of the springs 80. The entire combination constitutes an elastic, resilient system of counter-knives which is adapted to yield upon the entering of excessively resisting pieces of material into the refining or final comminuting portion, so as to thereby enable the passing of such pieces through the refining or subsequent comminuting device with the exclusion of ruptures.

In other respects the form of construction of the modification, shown in Figures 14 to 16 is substantially the same as the construction described with reference to the figures of the drawing previously referred to, so that a more detailed description is not necessary. It may, however, be mentioned that in the modification of Figures 14 to 16 there is no separate intermediate member between the hopper and the frame of the apparatus, as described with reference to the cage 36 of the construction above described, and that the hopper or funnel of the apparatus does not need to be subdivided into two separate sections. Also, the possibility of the self-actingly occurring lifting of the shaft of the knife-heads upon excessive strain, has been dispensed with in the modified construction, inasmuch as the engagement of the knives 76, 77 of the lower knife-head does not admit of such movement. In accordance therewith the driving of the apparatus by the shaft 11ª may be effected by means of the bevel gear wheels 12ª and 13ª without the insertion of the clutch coupling 15, 16 or the like, provided in the form of construction previously described.

The mode of operation of the entire apparatus is substantially as follows: If it is, for instance, desired to have the machine operate on enameled articles, such as pots, pails and other smaller or larger vessels, the material to be treated without any previous disassembling is thrown from above in whole pieces into the funnel 28, where the smaller pieces are immediately caught between the revolving knives 30ª and the stationary knives 30. The material is compressed, bent, cracked, twisted, and wrung by the cooperation of the arms of the rotating knife head 31 with the stationary knives 30 mounted on the ribs 49 of the hopper 28, and is finally cut up more or less between the knives 30 and 30ª. Besides, by the action of the rotating knives 30ª the coating still adhering to the metal pieces is scraped off. This is particularly true of tough coatings, such as paper pasted thereto, while enamel coatings have already been substantially broken and split off during the deformation preceding the comminution proper. The split-off enamel drizzles down as a kind of loose, sand-like mass between the more or less disintegrated pieces of metal and runs out of the apparatus along the chute 9 in advance of the comminuted pieces of metal obtained in the later stages of the process. In view of the fact that the hard enamel for the most part is broken off and snapped loose from the metal parts, before the cutting operation proper is effected, the knives 30, 30ª are very much saved, so that subsequent grinding thereof is very seldom necessary.

The larger particles which cannot directly lodge themselves between the cutting edges of the rotating knives 30ª and the wall of the hopper are first passing into the cavity formed by the inner edges of the knife arms 63, 64 and 65 and by a portion of the wall of the hopper 28, which cavity, as appears from Figure 2, substantially possesses the shape of an inverted truncated cone the axis of which is however excentric to the axis of rotation of the knife head 31. This excentric arrangement assists the catching of the articles between the rotating knife-arms on the one hand, and the abutments formed by the stationary knives 30 and their supporting ribs 49 on the other hand. Even larger articles which need not be taken apart or assorted on that account, will be liable to become stuck to the ribs 49 after some time during the course of their turning around caused by the knife head 31. They are then mostly caught by the wedge shaped upper end portion of the rotating knives 30ª, and are run up upon the knives and carried along thereby, which operation is combined with a vigorous deformation by compression, bending, wringing and squeezing. This stage is followed by the comminuting and disintegrating process proper produced by the cooperation of the knives 30 and 30ª. This procedure is continued in the interior of the lower section 34 of the hopper, where, moreover, the main action is the further cutting up of the larger parts of material and the further deformation of the smaller parts which are partly still provided with their enamel or other coatings. Into the subsequent or finishing comminuting means encompassing the knife head 32 the pieces of material are already delivered in a condition in which they have been substantially freed from their coatings. This part of the device completes the comminution of the working material which is then discharged from the apparatus by being delivered onto the chute 9 and allowed to run off therefrom. It has now assumed the form of a mass that can be readily shoveled or run into containers and which for the most part consists of flat pieces of small size, so that the resulting mass occupies comparatively but little volume, and can be conveniently handled and shipped. The individual fragments of the mass, in case the raw material consists of ordinary enameled articles, hardly present any oxidized surfaces, because the splintering of enamel leaves a substantially unoxidized surface. The mass obtained therefore constitutes a high-grade kind of scrap. In the treatment of preserve tin cans with labels or the like pasted thereon the coatings are mostly scraped off by the knives of the apparatus. This action is assisted by the simultaneous comminution which also destroys the continuity of the paper coats which, as a rule, do not adhere on their entire surface to the sheet metal material, so as to facilitate the detaching of such paper coats or the like.

It is obvious that metal waste having other coatings besides those heretofore mentioned or having no coatings at all may be treated by the machine described. Thus for instance, the machine may be efficiently used for the treatment of turning chips, such as are obtained as a waste in metal working shops. This kind of turning chips and the like which ordinarily become agglomerated into balls or clews almost impossible to be disentangled present great difficulties to transportation on account of their voluminous condition. By being treated in the apparatus described they are likewise converted with a comparatively small expenditure of power and exertion into a mass composed of small, flat pieces, and adapted to be shoveled and run off into containers or the like.

It should also be pointed out that non-metallic articles may likewise be successfully handled in the apparatus described. Thus for instance, in plants using wood saw dust as a fuel the necessity presents itself of adding coarser chopped wood to the saw dust for the purpose of improving the combustion. With this end in view in plants of this kind special sawing, moulding and similar machines have already been installed for the working of waste wood for the purpose of arriving at the desired degree of comminution. These machines are, however, unsuitable for the treatment of box-wood, such for example, as old used tea boxes and similar wooden articles containing nails, screws, iron bands or other metal parts, in view of the fact that the rapidly rotating comminuting means upon impinging against the metal parts produce sparks which are a frequent source of fires in the easily inflammable material. Furthermore these machines call for an amount of power out of proportion to the caloric value of the disintegrated wood obtained. By the employment of the machine according to this invention, the operation of which requires but very little driving power, the danger of inflammation is avoided, inasmuch as with this machine the action of the comparatively slowly moving comminuting members does not result in the formation of sparks, even when impinging against hard articles. The number of rotations of the knife shaft in the machine described, when working on metal articles, for instance metal chips and enameled utensils, amounts to about 30 revolutions a minute, while when working with wooden articles the number of revolutions may be somewhat higher.

In case of foreign bodies, such as screw bolts or other comparatively strong metal parts being fed to the apparatus along with the working material proper, and which cannot be directly comminuted, or in case the apparatus is otherwise excessively strained, for instance by excessive admission of fresh working material, the various safety means against rupture above described efficiently prevent the breaking, fracturing or injuring of valuable parts of the machine, which cannot be readily replaced.

The apparatus in such cases in the first place tries to overcome the resistance. In order to prevent excessive increase of current for the driving engine in such cases, which would result in the immediate blowing of the safety fuses, the fly wheel 20 is provided the momentum of which is in the first place consumed by the resistance presented, before the increase of load will become operative in the driving engine itself. If the resistance is not overcome by the comminuting members of the apparatus, and in case the trouble is not remedied even by the then eventually occurring automatic lifting of the knife shaft 6, one of the shearing or cutting-off safety means will be actuated according to the point, where the impediment exists. If the impediment exists in the upper section 33 of the hopper, the safety means constituting the coupling device 18, 19 and described in detail with reference to Figures 10 and 11 will be operated, the stud 45 being severed off upon the occurrence of excessive resistance by the cutting edge of the stop 46. The comminuting apparatus is thereby arrested, and the operator may ascertain the cause of the disturbance, and may remove the foreign body, if necessary after removing the closure 57, from the hopper. After the stud 45 has been again advanced within reach of the projecting portion of the stop 46, the apparatus may be again operated. In a similar manner the safety devices 40 and 73 are actuated, whenever an impediment exists in the lower hopper section 34 or in the finishing or supplementary comminuting device 32, 71.

With the modified form of construction represented in Figures 14 to 16, in case foreign bodies should get into the supplementary or finishing comminuting members, the particular segments of the annulus containing the relatively stationary knives 77 are adapted to yield and to be outwardly shifted contrary to the pressure of the springs 80, thereby taking the strain off from the apparatus.

I claim:—

1. Disintegrating apparatus comprising: a substantially conical hopper having stationary disintegrating means secured to its inner wall, a disintegrating member revolubly arranged within said hopper, a plurality of arms of different length upwardly projecting from said member and cooperating with said stationary disintegrating means.

2. Disintegrating apparatus comprising: a substantially hopper-like casing having slanting stationary disintegrating means secured to its inner wall, a disintegrating member revolubly arranged within said casing, a plurality of knife arms upwardly projecting from said member and coperating with said stationary disintegrating means, said knife arms being of different length and each disposed in such a manner that the lower end of its operating edge is in rear of its upper end, when seen in the direction of the rotation.

3. In a disintegrating apparatus, a bipartite hopper-like casing, a group of helical abutment ribs disposed on the inner wall of the upper portion of the casing, a group of helical abutment ribs disposed on the inner wall of the lower portion of the casing, gaps formed in said ribs, gaps formed between the ribs of the upper portion and the ribs of the lower portion, the ribs of the lower portion being sidewise shifted relatively to the ribs of the upper portion, and a revoluble knife head within said casing cooperating with said ribs.

4. In a disintegrating apparatus, a bipartite hopper-like casing, a group of helical abutment ribs disposed on the inner wall of the upper portion of the casing, a group of helical abutment ribs disposed on the inner wall of the lower portion of the casing, gaps formed in said ribs, gaps formed between the ribs of the upper portion and the ribs of the lower portion, the ribs of the lower portion being sidewise shifted relatively to the ribs of the upper portion, and an operating member revoluble within said casing and having a plurality of upwardly extending knife arms cooperating with said ribs.

5. In a disintegrating apparatus, a substantially hopper-like casing having a plurality of abutment ribs disposed on its inner wall in helical lines, said ribs being subdivided to form individual plane sections, individual plane knives secured to said rib sections, and a revoluble knife head within said casing cooperating with said ribs.

6. In a disintegrating apparatus: a casing, an operating member revolubly disposed within said casing, a plurality of arms of different length upwardly extending from said member and having knife edges on its outer sides, the inner sides of said arms in combination with the inner wall of the casing enclosing an upwardly enlarged conical space excentrically disposed with relation to the axis of said operating member and adapted to rotate therewith, counter-knives helically disposed on the inner wall of said casing and adapted to cooperate with said knife edges.

7. Apparatus of the kind described, comprising: a hopper-like casing, stationary knives secured to the inner wall of said casing, a knife head revolubly arranged within said casing and adapted to cooperate with said stationary knives, and means for automatically lifting said knife head upon the occurrence of excessive strains.

8. Apparatus of the kind described, comprising: a casing, stationary knives helically disposed on the inner wall of said casing, a shaft revoluble and axially shiftable within said casing, a knife head mounted upon said shaft and adapted to cooperate with said stationary knives, knives disposed on said knife head in such angular relation to said stationary knives that a lifting of the knife head is produced on an excessively strong piece of material being engaged by said knives.

9. Apparatus of the kind described, comprising: a casing, stationary knives helically disposed on the inner wall of said casing, a shaft revoluble and axially shiftable within said casing, a knife head mounted upon said shaft and adapted to cooperate with said stationary knives, knives disposed on said knife head in such angular relation to said stationary knives that a lifting of the knife head is produced on an excessively strong piece of material being engaged by said knives, and a loading weight counteracting the automatic lifting of the knife head.

10. Apparatus of the kind described, comprising: a casing, stationary knives helically disposed on the inner wall of said casing, a shaft revoluble and axially shiftable within said casing, a knife head mounted upon said shaft and adapted to cooperate with said stationary knives, knives disposed on said knife head in such angular relation to said stationary knives that a lifting of the knife head is produced on an excessively strong piece of material being engaged by said knives, a driving shaft, a coupling member on said driving shaft, and a loading weight secured to said first named shaft and counteracting the automatic lifting of the knife head, said weight being adapted to engage said coupling member.

11. In an apparatus of the kind described in combination: a bipartite casing comprising an upper and a lower section frictionally engageable with each other, interior stationary cutting means secured to said casing, interior superimposed knife heads disposed in said casing and adapted to cooperate with said stationary cutting means, supporting means for the upper section, and separate supporting means for the lower section.

12. In an apparatus of the kind described in combination: a bipartite casing comprising an upper and a lower section frictionally engageable with each other, interior stationary cutting means revolubly secured to said casing, interior superimposed knife heads disposed in said casing and adapted to cooperate with said stationary cutting means, supporting means for the upper section, and separate supporting means for the lower section, the upper section being rigidly secured to its supporting means, the lower section being only in frictional engagement with its supporting means.

13. In an apparatus of the kind described in combination: a bipartite casing comprising an upper and a lower section frictionally engageable with each other, interior stationary cutting means revolubly secured to said casing, interior superimposed knife heads disposed in said casing and adapted to cooperate with said stationary cutting means, supporting means for the upper section, and separate supporting means for the lower section, the upper section being rigidly secured to its supporting means, the lower section being only in frictional engagement with its supporting means, and means for regulating the frictional engagement between said upper and said lower section.

14. In an apparatus of the kind described in combination: a substantially horizontally bipartite casing comprising a relatively stationary upper section and a yielding lower section in frictional engagement therewith, interior cutting means on said casing, interior revoluble cutting means within said casing, supporting means for the upper section and supporting means for the lower section, and outwardly projecting safety means respectively connected to the stationary and to the frictionally engaged casing sections.

15. In an apparatus of the kind described in combination: a substantially horizontally bipartite casing comprising a relatively stationary upper section and a yielding lower section in frictional engagement therewith, interior cutting means on said casing, interior revoluble cutting means within said casing, supporting means for the upper section and supporting means for the lower section, and outwardly projecting safety means respectively connected to the stationary and to the frictionally engaged casing sections, and in shearing engagement with each other.

16. In an apparatus of the kind described in combination: a substantially horizontally bipartite casing comprising a relatively stationary upper section and a yielding lower section in frictional engagement therewith, interior cutting means on said casing, interior revoluble cutting means within said casing, supporting means for the upper section and supporting means for the lower section, and outwardly projecting safety means respectively connected to the stationary and to the frictionally engaged casing sections, and in shearing engagement with each other, and adjusting screws adapted to regulate said frictional engagement.

17. In an apparatus of the kind described in combination: a substantially horizontally bipartite casing comprising a relatively stationary upper section and a yielding lower section in frictional engagement therewith, interior cutting means on said casing, interior revoluble treating cutting means within said casing, a frame, a supporting member provided with lateral apertures, combined with said frame and supporting said upper section.

18. In an apparatus of the kind described in combination: an upper hopper-like casing, interior substantially helical cutting means extending substantially the height of said casing, a lower section in frictional engagement therewith, substantially helically disposed interior cutting means on said section, supporting means for said casing and supporting means for said lower section, rupturing connecting means between the lower section and the casing supporting means and adapted to be fractured upon excessive strain, superimposed rotatable cutting heads within said casing and within said lower section, and cutting knives on said cutting heads adapted for cooperation with the confronting cutting means of the casing and of the lower section.

19. In an apparatus of the kind described; an outer hopper-like casing, substantially helically arranged interior cutting means on said casing, interior superimposed rotatable cutting heads within said casing, supporting means for the casing, a driving shaft for said cutting heads, driving means for said shaft, a coupling member on said shaft, and a coupling member on said driving means, said coupling members shearingly engageable with each other.

20. In an apparatus of the kind described: an outer hopper-like casing, substantially helically arranged interior cutting means on said casing, interior superimposed rotatable cutting heads within said casing, supporting means for the casing, a driving shaft for said cutting heads, driving means for said shaft, a coupling member on said shaft, and a coupling member on said driving means, and a pin and cutting-edge safety connection between said coupling members.

21. In an apparatus of the kind described: a hopper-like casing, substantially helically arranged interior cutting members on said casing, interior superimposed cutting heads rotatable coaxially to said casing, a substantially cylindrical annulus provided with cutting members on its inner wall and surrounding the lower one of said cutting heads, the upper one cooperating with said interior cutting members, a frame body supporting said casing, said annulus being rotatably disposed intermediate the frame and the casing, and rupturing safety means adapted to prevent the rotating movement of the annulus in the normal operation of the apparatus.

22. In an apparatus of the kind described: a hopper-like casing, substantially helically arranged interior cutting members on said casing, interior superimposed cutting heads rotatable coaxially to said casing, a substantially cylindrical annulus provided with cutting members on its inner wall and surrounding the lower one of said cutting heads, the upper one cooperating with said interior cutting members, a frame body supporting said casing, said annulus being rotatably disposed on said frame, and exchangeable rupturable stays connecting said annulus and said frame.

23. In a comminuting apparatus of the kind described: a substantially hopper-like casing, substantially helically disposed abutment ribs inwardly projecting from said casing and integral therewith, knives exchangeably disposed on the lower sides of said ribs, and cooperating rotatable knives in the interior of the casing.

24. In a comminuting apparatus of the kind described; a substantially hopper-like casing, substantially helically disposed abutment ribs inwardly projecting from said casing and integral therewith, knife blades exchangeably secured on the lower sides of said ribs, screw bolts passing through said ribs and knife blades, the heads of said bolts being countersunk in the upper sides of said ribs, and a knife head rotatably mounted in the interior of the casing and adapted to cooperate with said ribs and knife blades.

25. In a comminuting apparatus of the kind described: a substantially hopper-like casing, substantially helically disposed abutment ribs inwardly projecting from said casing and integral therewith, knives exchangeably disposed on the lower sides of said ribs, set screws inserted from the outside of the casing into the wall of the same and engageable by their inner ends with the outer edges of the knife blades, and a knife head rotatably mounted in the interior of the casing and adapted to cooperate with said ribs and knife blades.

26. In a comminuting apparatus of the kind described: a substantially hopper-like casing, substantially helically disposed abutment ribs inwardly projecting from said casing and integral therewith, the upper sides of said ribs forming an obtuse angle with the wall of the casing, knives exchangeably disposed on the lower sides of said ribs, and cooperating rotatable knives in the interior of the casing.

27. In a comminuting apparatus of the kind described: a substantially hopper-like casing, substantially helically disposed abutment ribs inwardly projecting from said casing and integral therewith, knives exchangeably disposed on the lower sides of said ribs, set screws inserted from the outside of the casing into the wall of the same and engageable by their inner ends with the outer edges of the knife blades, some of said ribs provided with adjacently disposed recessed portions in the wall of the casing below said ribs and adapted to afford a seating for the fastening screws, and a knife head rotatably mounted in the interior of the casing and adapted to cooperate with said ribs and knife blades.

28. In a disintegrating and comminuting apparatus, in combination, an outer bipartite, substantially hopper-like casing, knives angularly disposed on the inner walls of the casing, rotary cooperating counter-knives in the interior of the casing, a lower frictionally engaged section on the casing, a skeleton frame supporting the upper section and adapted to afford access to the lower section, and discharging means on said casing.

In testimony whereof I affix my signature.

RICHARD PHILIPP.